US012301599B2

(12) United States Patent
Juliato et al.

(10) Patent No.: US 12,301,599 B2
(45) Date of Patent: May 13, 2025

(54) ATTACKER LOCALIZATION BASED ON TRACKING ANOMALY PROPAGATION IN TIME-SENSITIVE NETWORKING

(71) Applicant: Intel Corporation, Santa Clara, CA (US)

(72) Inventors: Marcio Juliato, Portland, OR (US); Javier Perez-Ramirez, North Plains, OR (US); Vuk Lesi, Cornelius, OR (US); Dave Cavalcanti, Portland, OR (US); Manoj Sastry, Portland, OR (US); Christopher Gutierrez, Hillsboro, OR (US); Qian Wang, Portland, OR (US); Shabbir Ahmed, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 511 days.

(21) Appl. No.: 17/484,197

(22) Filed: Sep. 24, 2021

(65) Prior Publication Data

US 2022/0014540 A1 Jan. 13, 2022

(51) Int. Cl.
*H04L 9/40* (2022.01)

(52) U.S. Cl.
CPC ................. *H04L 63/1425* (2013.01)

(58) Field of Classification Search
CPC .. H04J 3/0638; H04L 2463/146; H04L 47/28; H04L 47/2483; H04L 63/14–1425; H04L 2463/121; H04W 84/18
See application file for complete search history.

(56) References Cited

U.S. PATENT DOCUMENTS

| 2017/0060102 | A1* | 3/2017 | Sargolzaei | ........... G05B 13/021 |
| 2019/0349392 | A1* | 11/2019 | Wetterwald | ......... H04L 43/0852 |
| 2020/0252424 | A1* | 8/2020 | Regev | ................... H04J 3/0667 |
| 2022/0014532 | A1 | 1/2022 | Perez-Ramirez | |
| 2022/0070082 | A1* | 3/2022 | Hall | ...................... H04L 12/437 |

(Continued)

FOREIGN PATENT DOCUMENTS

| CN | 115865395 A | 3/2023 |
| EP | 4156603 A1 | 3/2023 |
| NL | 2032769 A | 3/2023 |

OTHER PUBLICATIONS

Cisco, "Time-Sensitive Networking: A technical Introduction," <cisco.com/c/dam/en/US/solutions/collateral/industry-solutions/white-paper-c11-738950.pdf#:~:text=What%20is%20time-sensitive%20networking%20%28TSN%29%3F%20In%20its%20simplest,scheduling%20for%20those%20real-time%20applications%20that%20require%20determinism.>, 2017, 8 pages.

(Continued)

*Primary Examiner* — Daniel B Potratz
*Assistant Examiner* — Andrew J Ganous
(74) *Attorney, Agent, or Firm* — JAFFERY WATSON HAMILTON DESANCTIS LLP

(57) ABSTRACT

Systems, apparatuses and methods may provide for technology that detects one or more non-compliant nodes with respect to a timing schedule, detects one or more compliant nodes with respect to the timing schedule, and identifies a malicious node based on positions of the one or more non-compliant nodes and the one or more compliant nodes in a network topography. The non-compliant node(s) and the compliant node(s) may be detected based on post-synchronization messages, historical attribute data and/or plane diversity data.

15 Claims, 19 Drawing Sheets

(56) References Cited

U.S. PATENT DOCUMENTS

2024/0089813 A1\* 3/2024 Zou .................. H04W 36/0007

OTHER PUBLICATIONS

K. Hewitt, "KPI's for Security Operations & Incident Response," <securityscorecard.com/blog/kpis-for-security-operations-incident-response>, Jun. 7, 2021, 11 pages.
National Search Report and Written Opinion, Dutch Application No. NL 2032769, Issued Mar. 9, 2023, 9 pages including translation.
Communication, Extended European Search Report for EP Application No. 22185643.8, mailed Jan. 2, 2023, 8 pages.

\* cited by examiner

ATTACKER LOCALIZATION BASED ON TRACKING ANOMALY PROPAGATION IN TIME-SENSITIVE NETWORKING

TECHNICAL FIELD

Embodiments generally relate to networking security. More particularly, embodiments relate to attacker localization based on tracking anomaly propagation in time-sensitive networking.

BACKGROUND

Time-sensitive networking (TSN) environments (e.g., robotics) may include follower nodes that are coupled to a leader node (e.g., having a reference clock) via one or more switch nodes. An attacker (e.g., malicious code) running on one of the nodes can impact time synchronization by delaying messages and modifying residence time on switch nodes. As a result, desynchronization of the follower nodes with respect to the reference clock may occur when the follower nodes run a time synchronization protocol. Additionally, the attacker may remain undetected in the compromised node.

DETAILED DESCRIPTION OF EMBODIMENTS

Figure 1A:
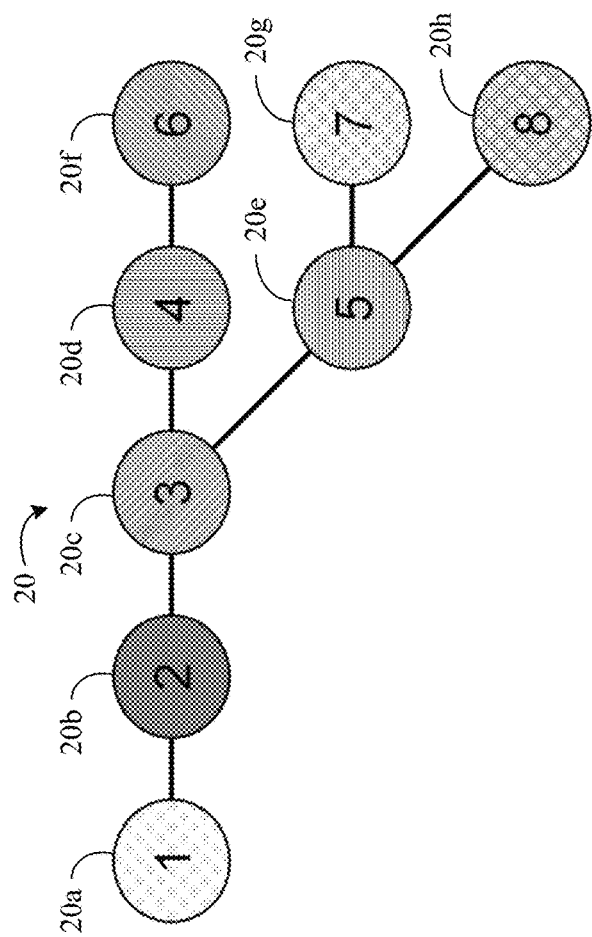
FIG. 1A is an illustration of an example of a network topography and a timing schedule according to an embodiment.
Figure 1A:
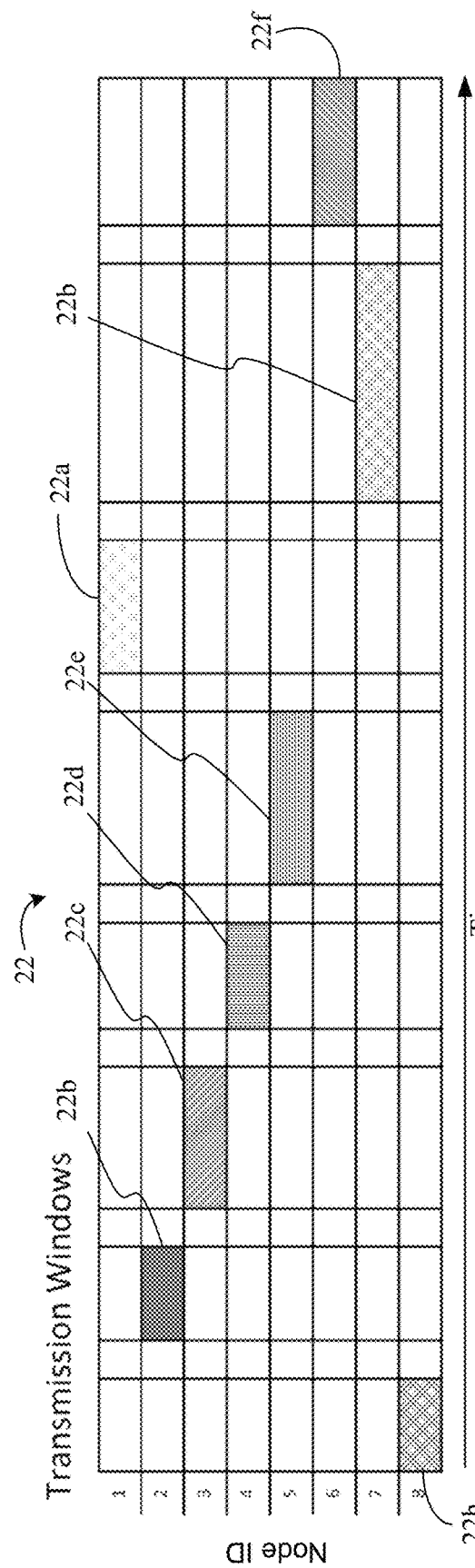

FIG. 1A shows a network topography 20 (20a-20h) such as, for example, a time-sensitive network (TSN) topography. The network topography 20 may be deployed in a variety of environments such as, for example, a robotics environment, autonomous vehicle, Internet of Things (IoT) environment, and so forth. In the illustrated example, a plurality of follower nodes 20f-20h (e.g., nodes "6" through "8") are coupled to a leader node 20a (e.g., node "1" having a reference clock) via a plurality of switch nodes 20b-20e (e.g., nodes "2" through "5").

The illustrated network topography 20 communicates in accordance with a timing schedule 22 (22a-22h, e.g., Institute of Electrical and Electronics Engineers/IEEE 802.1Qbv, Standard for Local and Metropolitan Area Networks-Media Access Control (MAC) Bridges and Virtual Bridged Local Area Networks Amendment: Enhancements for Scheduled Traffic). For example, the leader node 20a is scheduled to transmit messages during a time window 22a, a first switch node 20b is scheduled to transmit messages during a time window 22b, a second switch node 20c is scheduled to transmit messages during a time window 22c, and so forth.

Figure 1B:
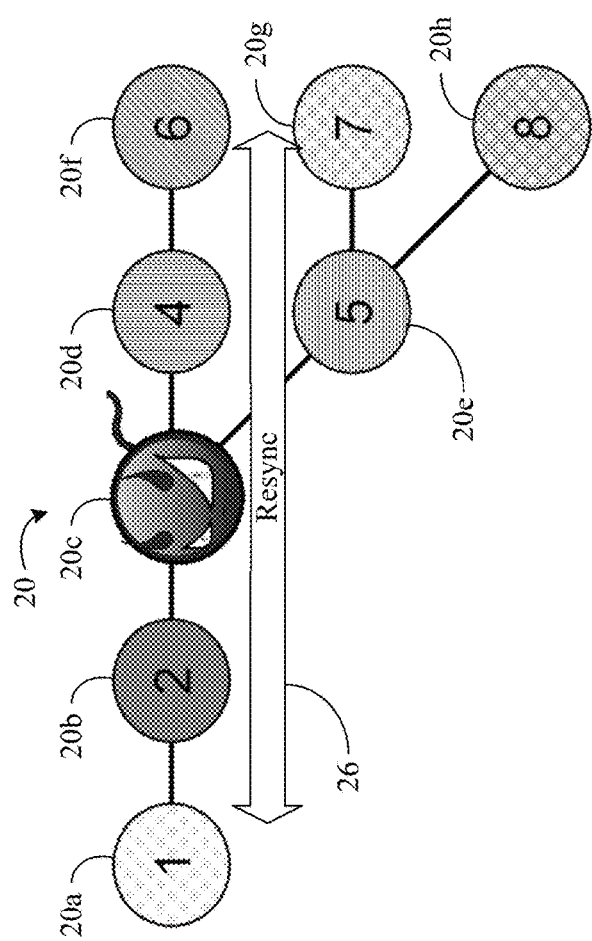
FIG. 1B is an illustration of an example of a network topography having a malicious node during a resynchronization of a follower node according to an embodiment.
Figure 1B:
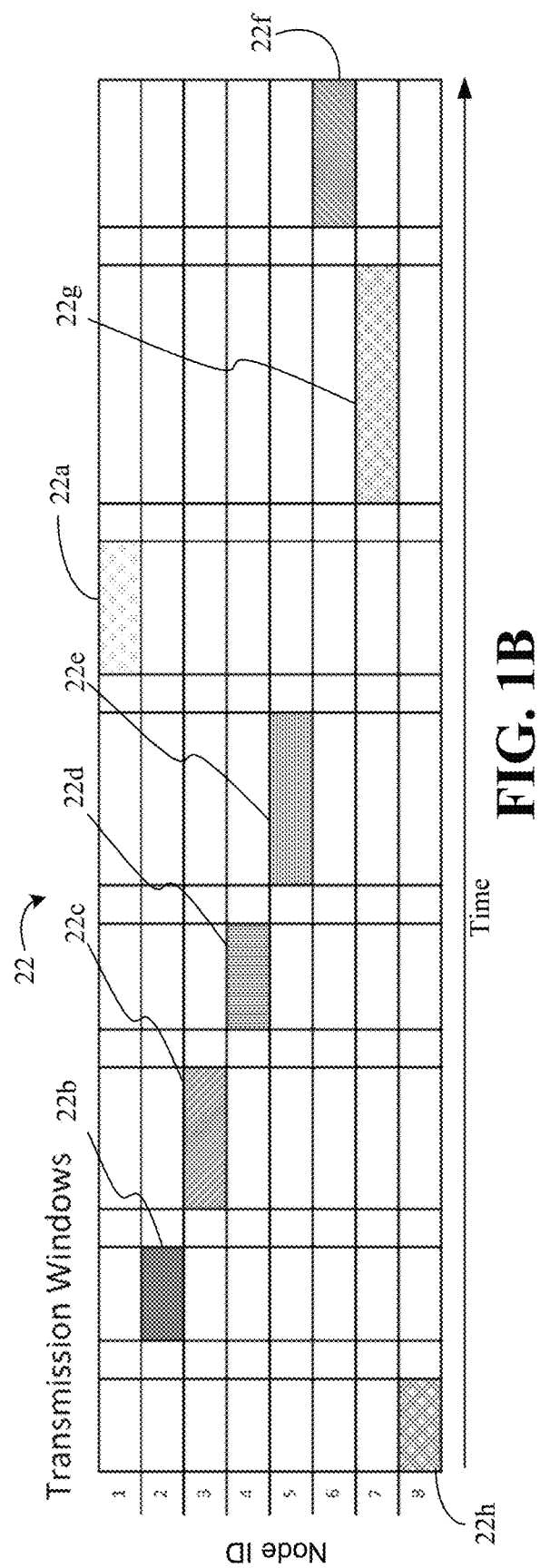

FIG. 1B shows an example in which an attacker converts the second switch node 20c into a malicious node. Thus, the second switch node 20c might delay messages, modify residence times on switches, and so forth. When a first follower node 20f conducts a resynchronization 26 ("re-sync") with respect to the reference clock of the leader node 20a, the resynchronization 26 fails because the second switch node 20c is positioned in a critical path between the leader node 20a and the first follower node 20f Accordingly, the first follower node 20f becomes desynchronized.

Figure 1C:
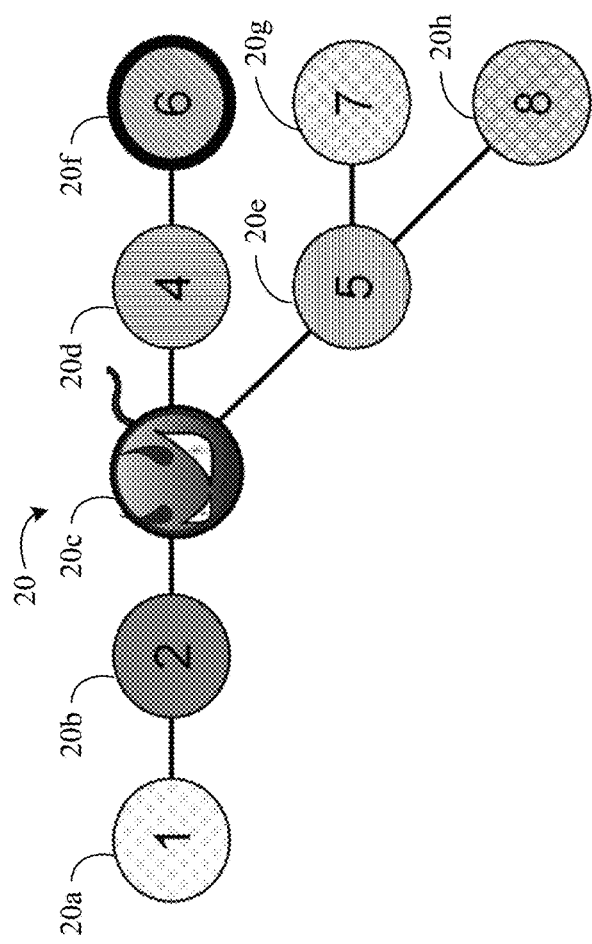
FIG. 1C is an illustration of an example of a non-compliant follower node with respect to a timing schedule according to an embodiment.
Figure 1C:
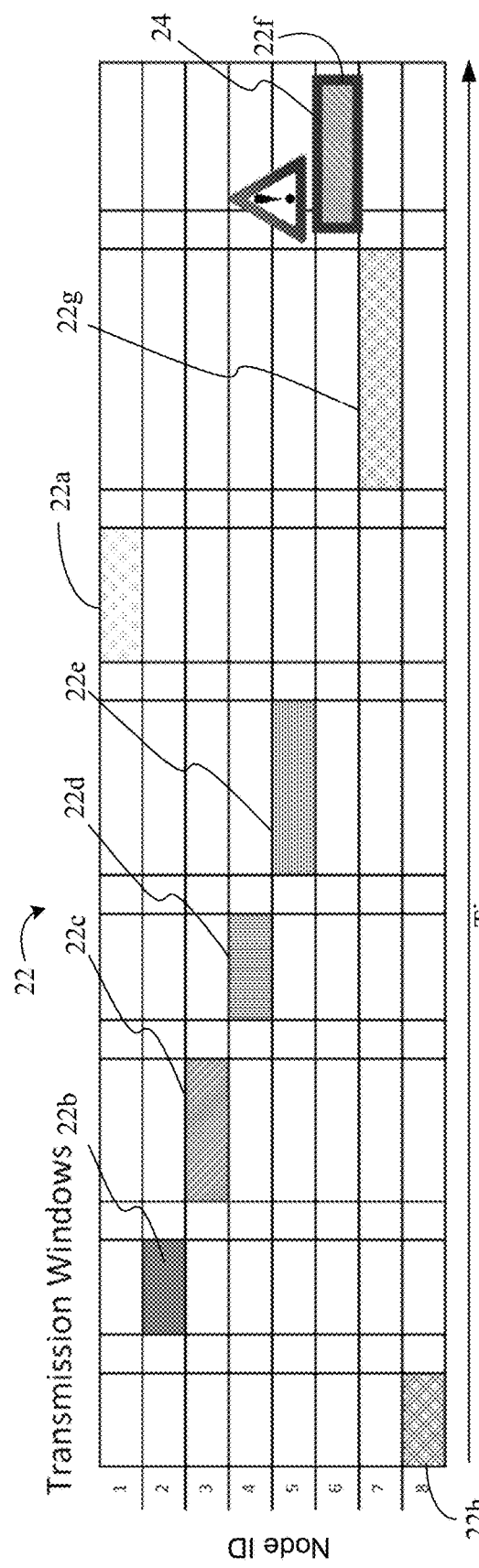

FIG. 1C shows the result of the desynchronization of the first follower node 20f In the illustrated example, the first follower node 20f transmits one or more post-synchronization messages 24 outside a time window 22f corresponding to the first follower node 20f. Embodiments provide for detecting that the first follower node 20f is a non-compliant node with respect to the timing schedule 22 and determining the location of the malicious node in the network topography 20 from a single point (e.g., monitor node).

Figure 1D:
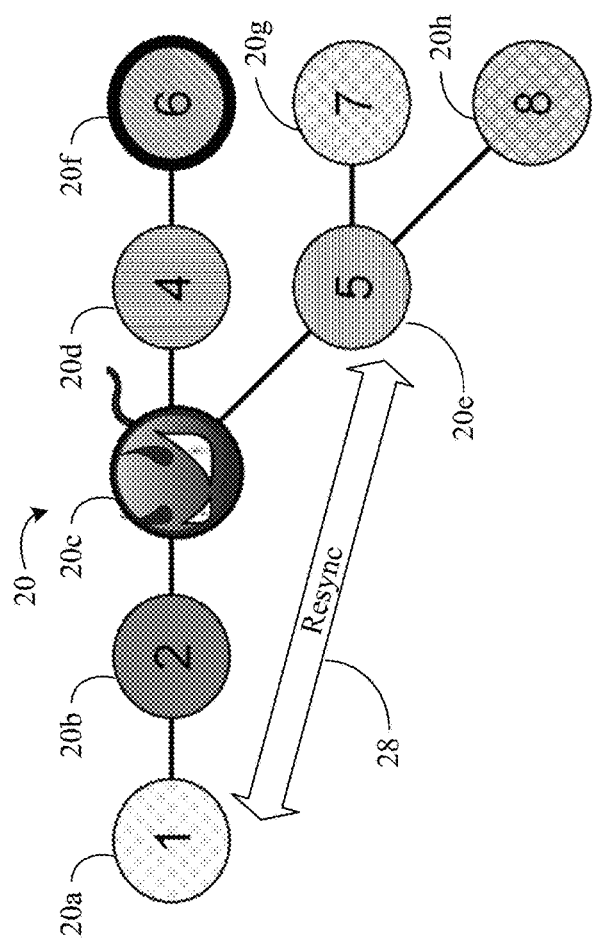
FIG. 1D is an illustration of an example of a network topography having a malicious node during a resynchronization of a switch node according to an embodiment.
Figure 1D:
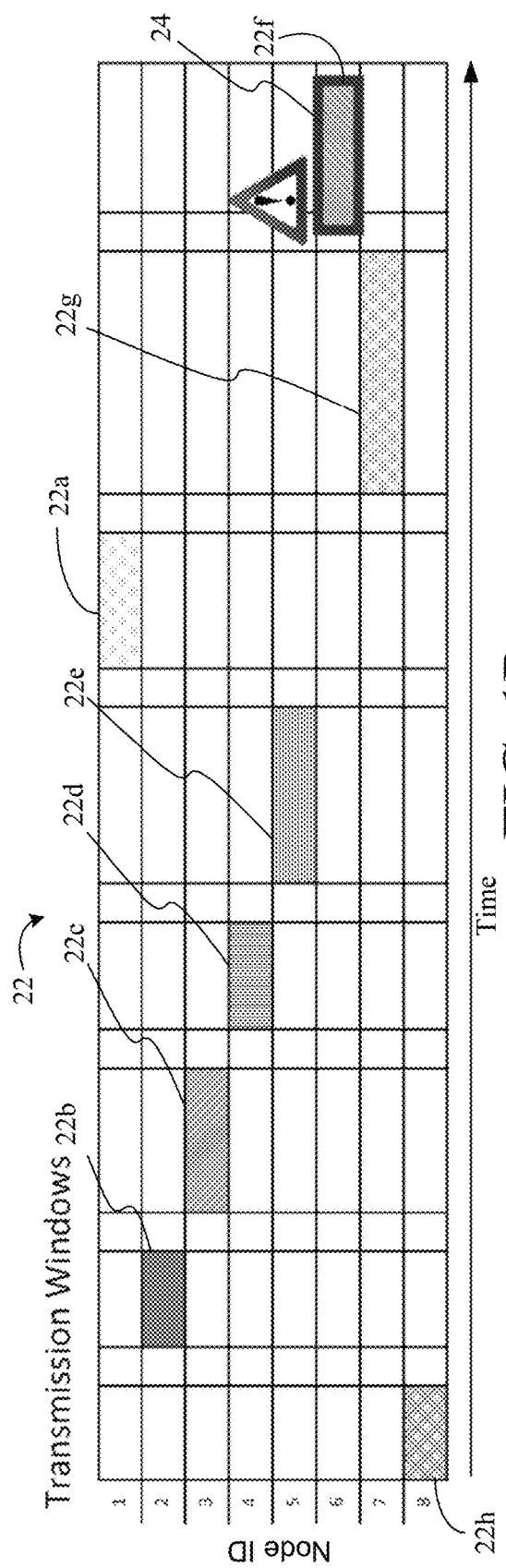

FIG. 1D shows a resynchronization 28 being conducted for a fourth switch node 20e with respect to the reference clock of the leader node 20a. Because the second switch node 20c is located in a critical path between the leader node 20a and the fourth switch node 20e, the resynchronization 28 fails and the fourth switch node 20e becomes desynchronized.

Figure 1E:
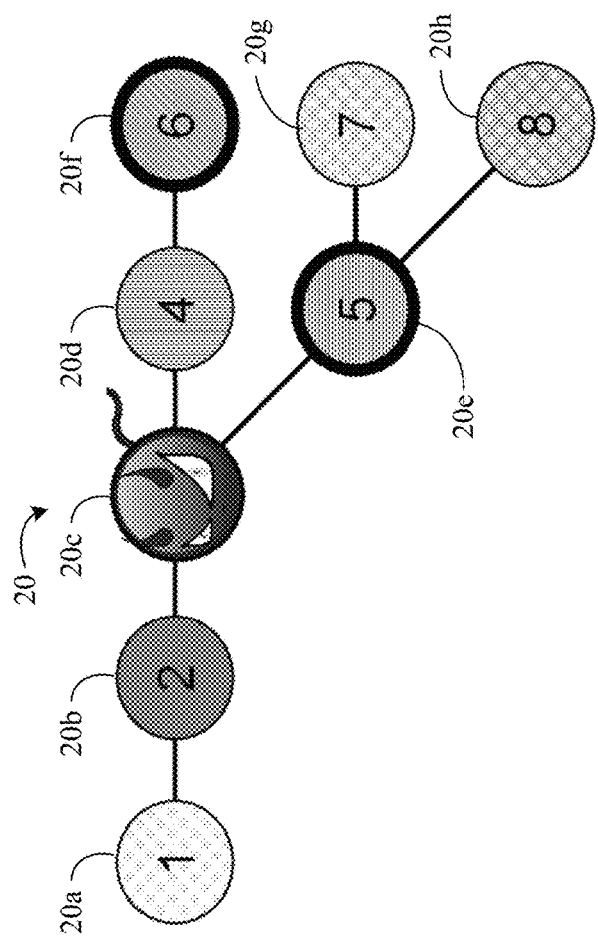
FIG. 1E is an illustration of an example of a non-compliant follower node and a non-compliant switch node with respect to a timing schedule according to an embodiment.
Figure 1E:
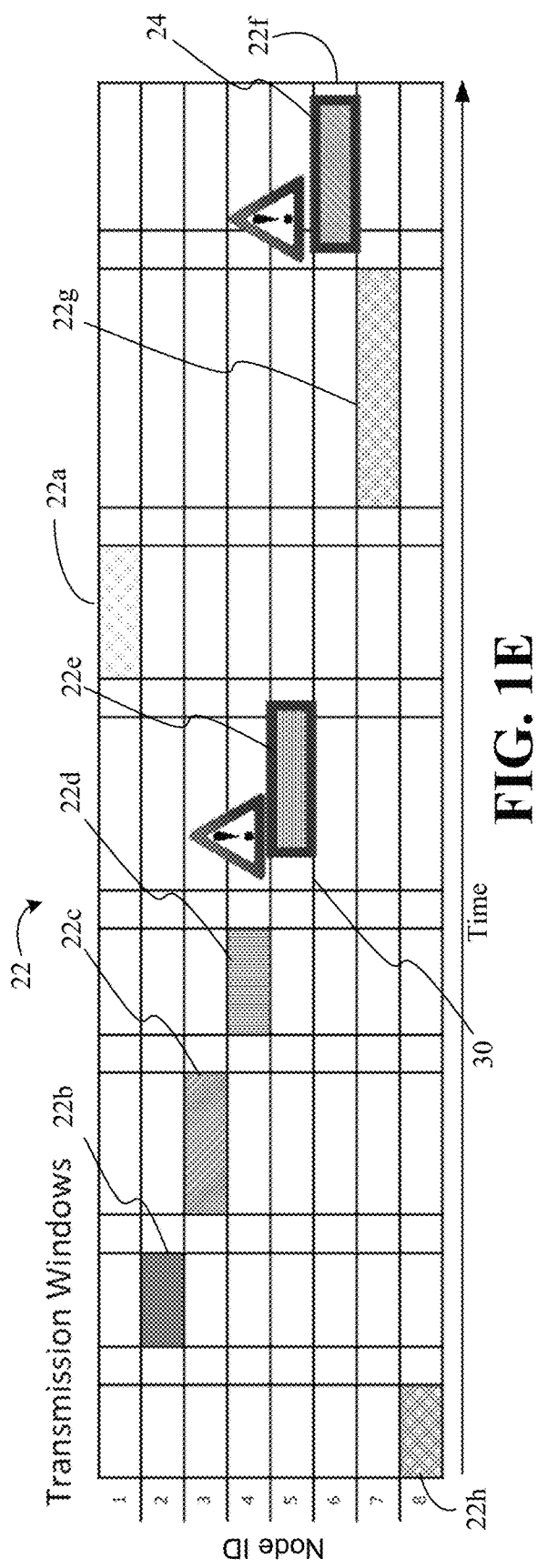

FIG. 1E shows the result of the desynchronization of the fourth switch node 20e. In the illustrated example, the fourth switch node 20e transmits one or more post-synchronization messages 30 outside a time window 22e corresponding to the fourth switch node 20e. Thus, the fourth switch node 20e may be determined to be a non-compliant node with respect to the timing schedule 22.

Figure 1F:
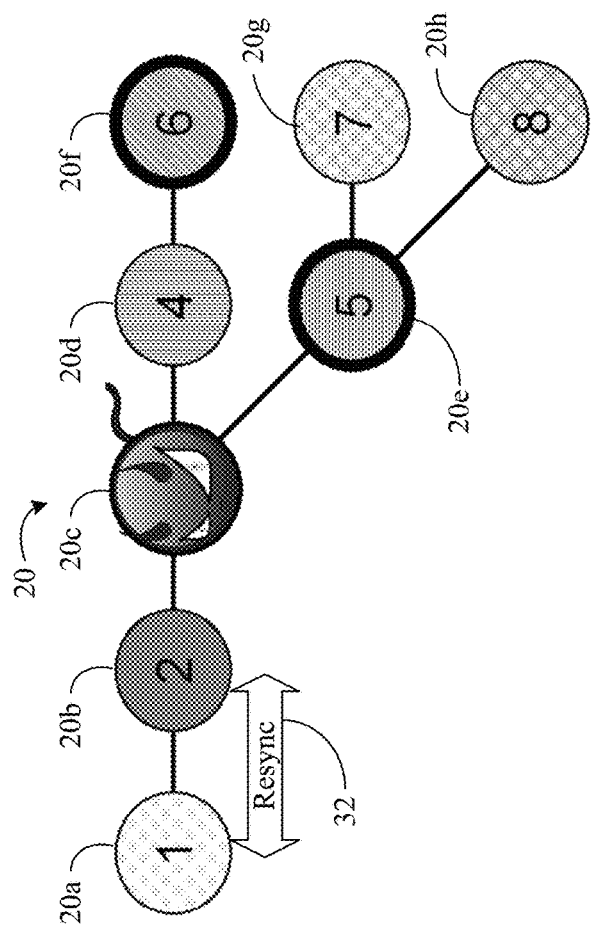
FIG. 1F is an illustration of an example of a network topography having a malicious node during a resynchronization of another switch node according to an embodiment.
Figure 1F:
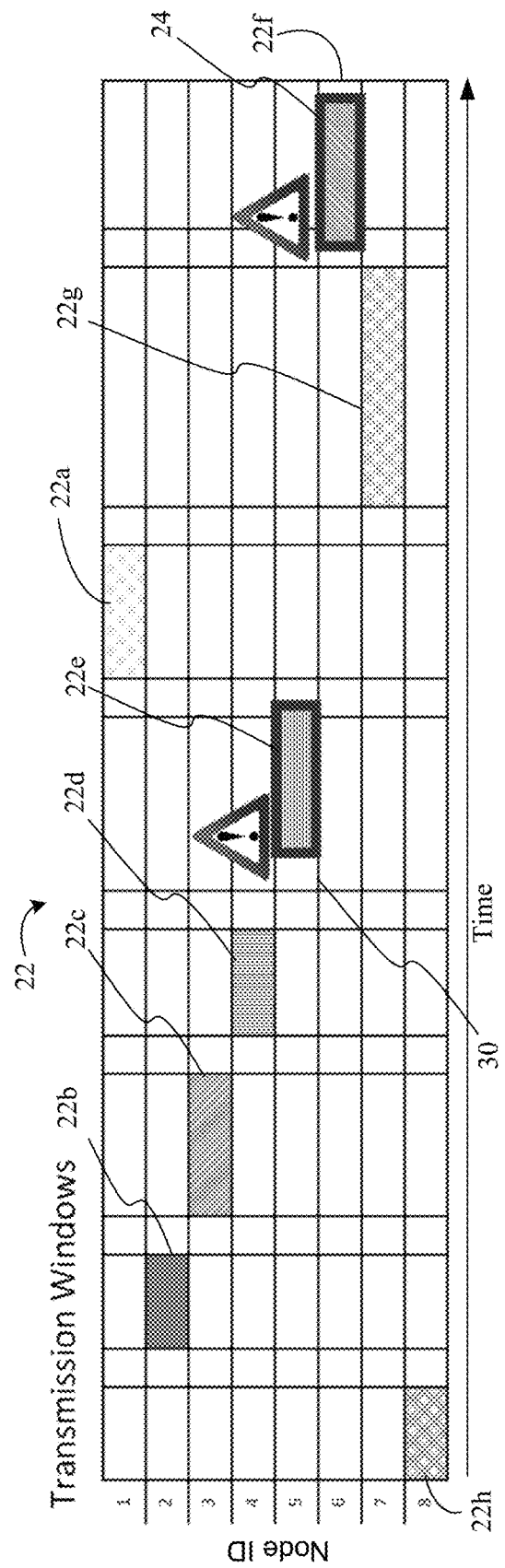

FIG. 1F shows a resynchronization 32 being conducted for the first switch node 20b with respect to the reference clock of the leader node 20a. Because the second switch node 20c is not located in a critical path between the leader node 20a and the first switch node 20b, the resynchronization 32 succeeds and the first switch node 20b becomes synchronized (e.g., compliant).

Figure 1G:
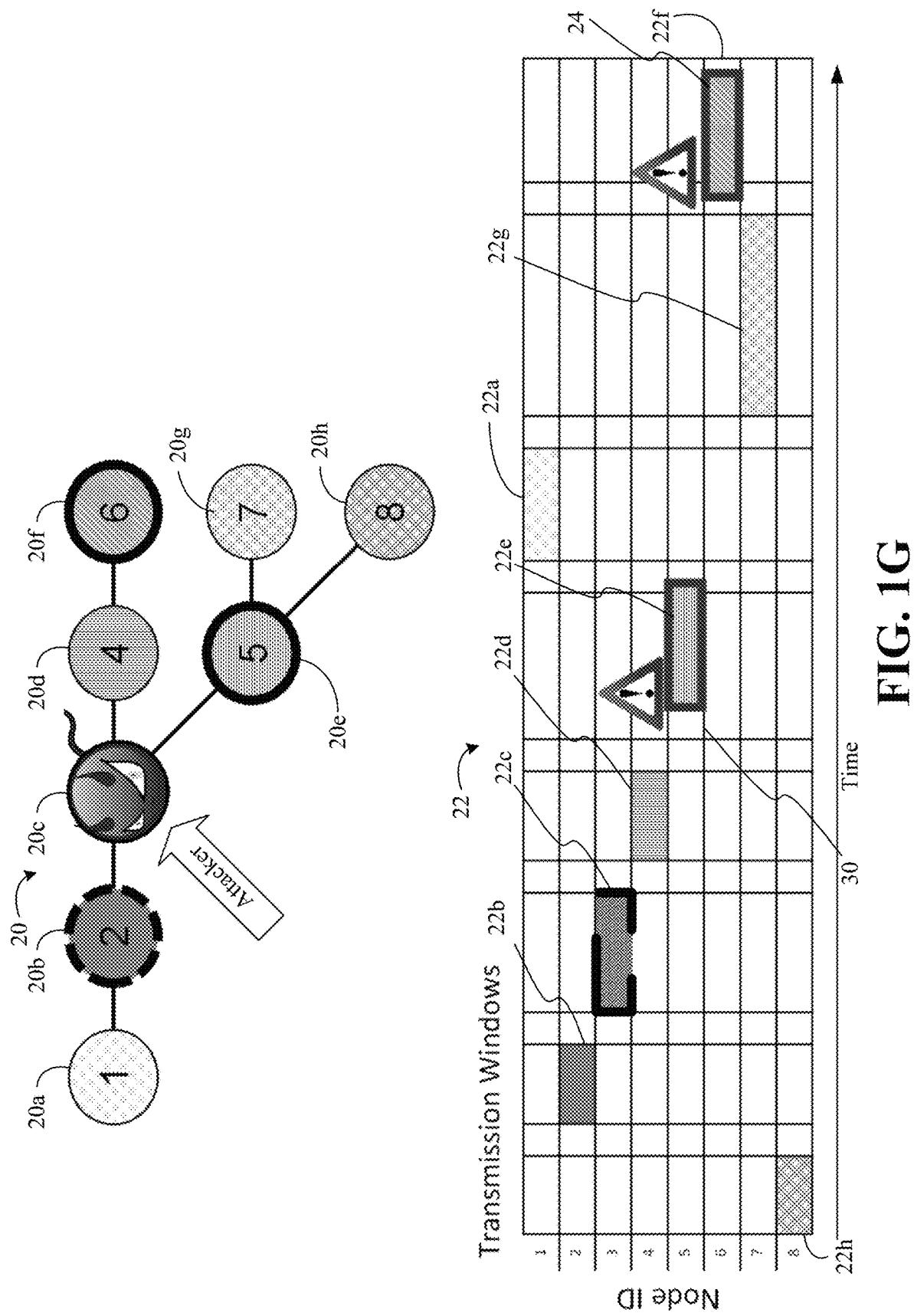
FIG. 1G is an illustration of an example of an identification of a malicious node based on positions of non-compliant nodes and compliant nodes in a network topography according to an embodiment.

FIG. 1G demonstrates that the detection of the first follower node 20f and the fourth switch node 20e as non-compliant nodes, the detection of the first switch node 20b as a compliant node, and knowledge of the positions of the non-compliant and compliant nodes in the network topography 20 enables the second switch node 20c to be automatically identified as a malicious node (e.g., attacker). More particularly, the illustrated second switch node 20c is the most likely candidate to be the attacker because the second switch node 20c is in the critical paths of both non-compliant nodes and the first switch node 20b (e.g., the only other node in the critical paths of both non-compliant nodes) is compliant.

Figure 2:
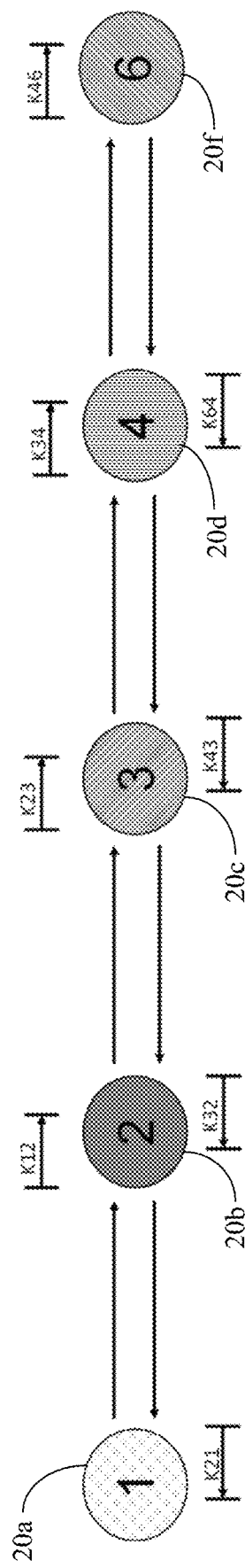
FIG. 2 is an illustration of an example of remote performance measurements according to an embodiment.

FIG. 2 shows remote performance measurements (e.g., key performance indicator/KPI measurements) being taken at various positions in a network topography. In general, Kab refers to KPI measurements made by node "b" on a message received from node "a". Thus, K21 is the KPI measurement made by the leader node 20a on a message received from the first switch node 20b, K12 is the KPI measurement made by the first switch node 20b on a message received from the leader node 20a, K32 is the KPI measurement made by the first switch node 20b on a message received from the second switch node 20c, and so forth. The KPI measurement may include a frame ingress time measurement, a residence time measurement, a correction field measurement, etc., or any combination thereof. In general, a correction field may reflect the time that packets take to traverse the network wired/wireless medium and the time that the packets spend in devices. This time may accumulate as the packets travel the network. By the time a packet arrives to a destination, the correction field contains the total transmit time through the network.

Figure 3A:
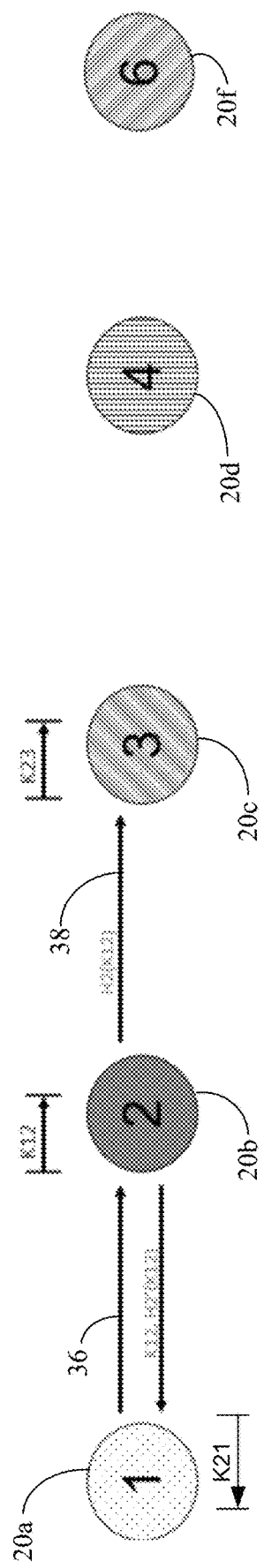
FIGS. 3A-3E are illustrations of examples of the use of remote performance measurements and keyed hash values to determine whether nodes are compliant or non-compliant with respect a timing schedule according to embodiments.

FIG. 3A shows a communication example in which the leader node 20a functions as a monitor node. In the illustrated example, the leader node 20a sends a message 36 to the first switch node 20b and the first switch node 20b makes the remote performance measurement K12 with respect to the message 36. The first switch node 20b shares a cryptographic key pair with the leader node 20a and generates a backward path keyed hash value H2' (e.g., for Hx(y), a keyed hash digest done by node x over data y) that is a function of the remote performance measurement K12 and the key pair shared with the leader node 20a. In the illustrated example, the first switch node 20b sends the remote performance measurement K12 and the backward path keyed hash value H2' back to the leader node 20a. The first switch node 20b may also send a forward path keyed hash value H2 as a message 38 to the second switch node 20c. The illustrated second switch node 20c makes the remote performance measurement K23 with respect to the message 38.

Figure 3B:
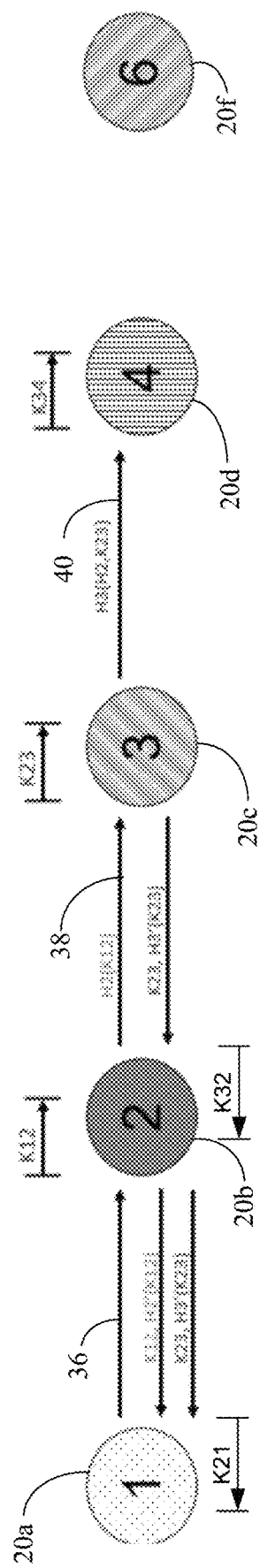

FIG. 3B demonstrates that the second switch node 20c may generate a backward path keyed hash value H3' that is a function of the remote performance measurement K23 and a key pair shared between the second switch node 20c and the leader node 20a. In the illustrated example, the second switch node 20c sends the remote performance measurement K23 and the backward path keyed hash value H3' back to the first switch node 20b. Additionally, the first switch node 20b forwards the remote performance measurement K23 and the backward path keyed hash value H3' to the leader node 20a. The second switch node 20c may also send a forward path keyed hash value H3 as a message 40 to the third switch node 20d, wherein H3 is a function of H2, K23 and the key pair shared with the leader node 20a. The illustrated third switch node 20d makes the remote performance measurement K34 with respect to the message 40.

Figure 3C:
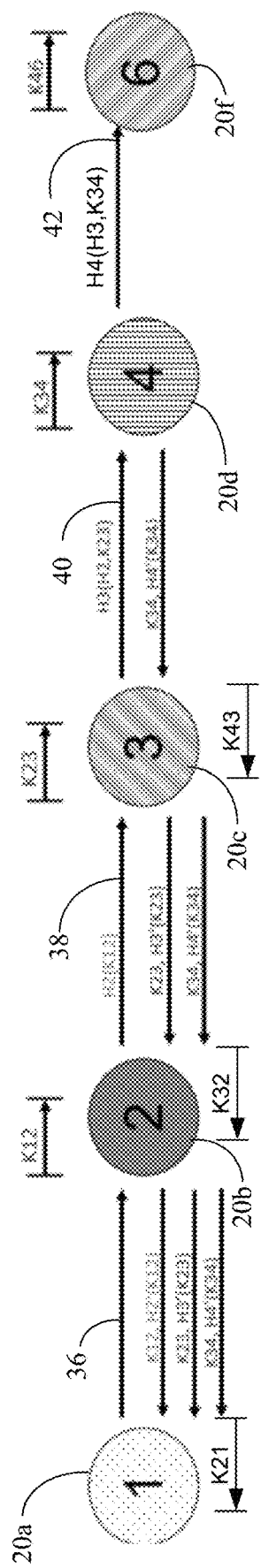

FIG. 3C demonstrates that the third switch node 20d may generate a backward path keyed hash value H4' that is a function of the remote performance measurement K34 and a key pair shared between the third switch node 20d and the leader node 20a. In the illustrated example, the third switch node 20d sends the remote performance measurement K34 and the backward path keyed hash value H4' back to the second switch node 20c. Additionally, the second switch node 20c forwards the remote performance measurement K34 and the backward path keyed hash value H4' to the first switch node 20b, which in turn forwards the remote performance measurement K34 and the backward path keyed hash value H4' to the leader node 20a. The third switch node 20d may send a forward path keyed hash value H4 as a message 42 to the first follower node 20f, wherein H4 is a function of H3, K34 and the key pair shared with the leader node 20a. The illustrated first follower node 20f makes the remote performance measurement K46 with respect to the message 42.

Figure 3D:
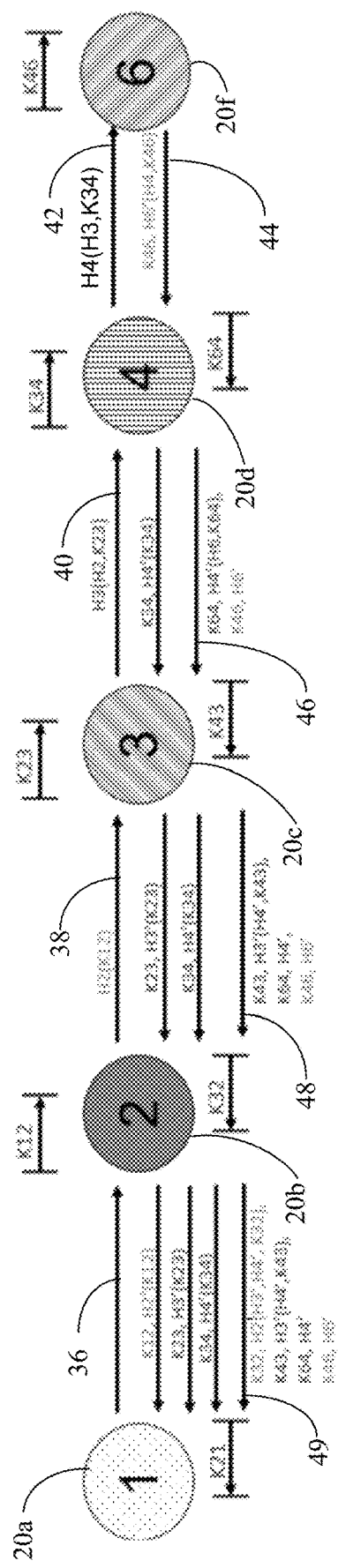

FIG. 3D demonstrates that the first follower node 20f may generate a backward path keyed hash value H6' that is a function of H4, the remote performance measurement K46 and the key pair shared with the third switch node 20d. In the illustrated example, the first follower node 20f sends the remote performance measurement K46 and the backward path keyed hash value H6' back to the third switch node 20d as a message 44. Additionally, the third switch node 20d forwards the remote performance measurement K64 and the backward path keyed hash value H6' to the second switch node 20c, which in turn forwards the remote performance measurement K64 and the backward path keyed hash value H6' to the first switch node 20b. The first switch node 20b forwards the remote performance measurement K64 and the backward path keyed has value H6' to the leader node 20a.

In an embodiment, the third switch node 20d also makes the remote performance measurement K64 with respect to the message 44 and generates another backward path hash value H4' that is a function of H6' and K64. The illustrated third switch node 20d then sends K64 and H4' back to the second switch node 20c in a message 46. The second switch node 20c may make the remote performance measurement K43 with respect to the message 46 and generate another backward path keyed hash value H3' that is a function of H4' and K43. The second switch node 20c than sends K43 and H3' back to the first switch node 20b in a message 48. In an embodiment, the first switch node 20b makes the remote performance measurement K32 with respect to the message 48 and generates another backward path keyed hash value H2' that is a function of H3', H4' and K32. The illustrated first switch node 20b then sends K32 and H2' back to the leader node 20a in a message 49. Each of the keyed hash values may also be associated with a time stamp to prevent playback attacks from succeeding. In general, the leader node 20a checks keyed hash changes and verifies which keyed hashes fail. Failure of verification of the keyed hash represents that an attacker tampered with the keyed hash. Therefore, by analyzing which keyed hashes verified successfully and which keyed hashes failed, it is possible to determine where the attacker is localized. Upon verification of the keyed hash, the monitor can inspect the KPIs that accompanied the message. This inspection enables the monitor to verify the historical context of the KPIs across the network and determine if the KPIs are violating performance/measurement expectations.

Figure 3E:
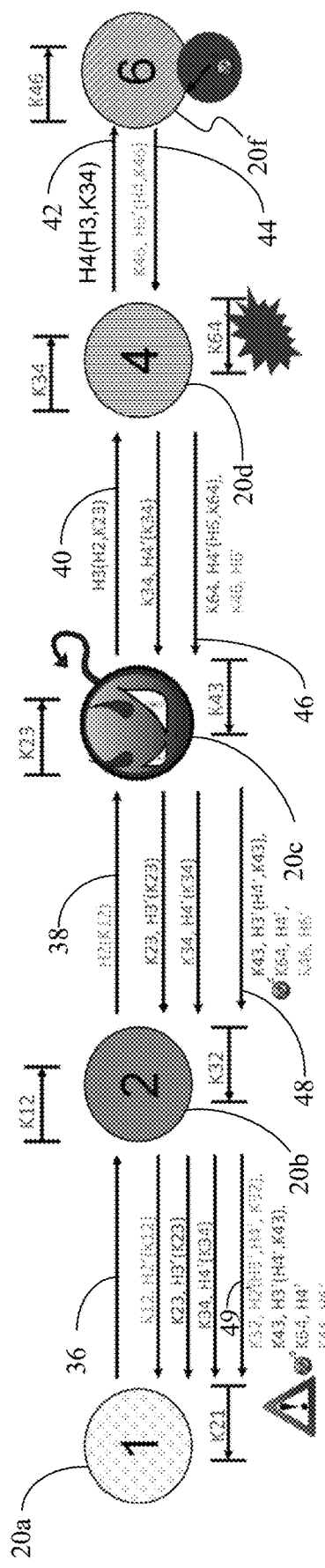

FIG. 3E demonstrates that an attacker on the second switch node 20c may desynchronize the first follower node 20f. In such a case, the keyed hash value carries authenticity protection to the KPI being transferred to the leader node 20a (e.g., monitor node). Upon reception of the remote performance measurement K64, the leader node 20a detects that the first follower node 20f is out of sync. Moreover, if the malicious code on the second switch node 20c changes K64, the verification of K64 will fail, which would indicate that either the second switch node 20c or the first follower node 20f are potentially compromised.

Figure 4:
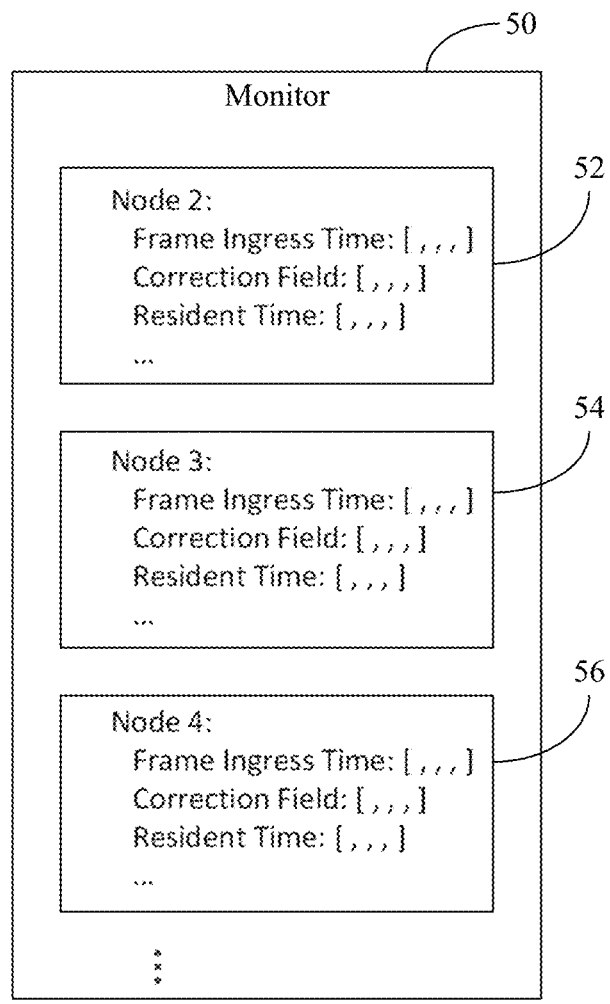
FIG. 4 is a block diagram of an example of a monitor node according to an embodiment.

Turning now to FIG. 4 a monitor node 50 is shown in which historical attributes are collected for the nodes of a time-sensitive network. In the illustrated example, the monitor node 50 collects a first set 52 of historical attributes for "Node 2", a second set 54 of historical attributes for "Node 3", and a third set 56 of historical attributes for "Node 4". The attributes may include, for example, the frame ingress time in relation to the protected window, the residence time within the node, the correction field of incoming messages, and so forth. In an embodiment, the monitor node 50 collects the information over time and uses time-series analysis to inspect the historical context of the measurements. Thus, deviations over time may trigger anomaly/attack detection. Thus, non-compliant nodes may be detected based on historical attribute data. The monitor node 50 may implemented in a clock leader, edge node or other node having visibility and the ability to communicate with nodes of interest in the network.

Figure 5:
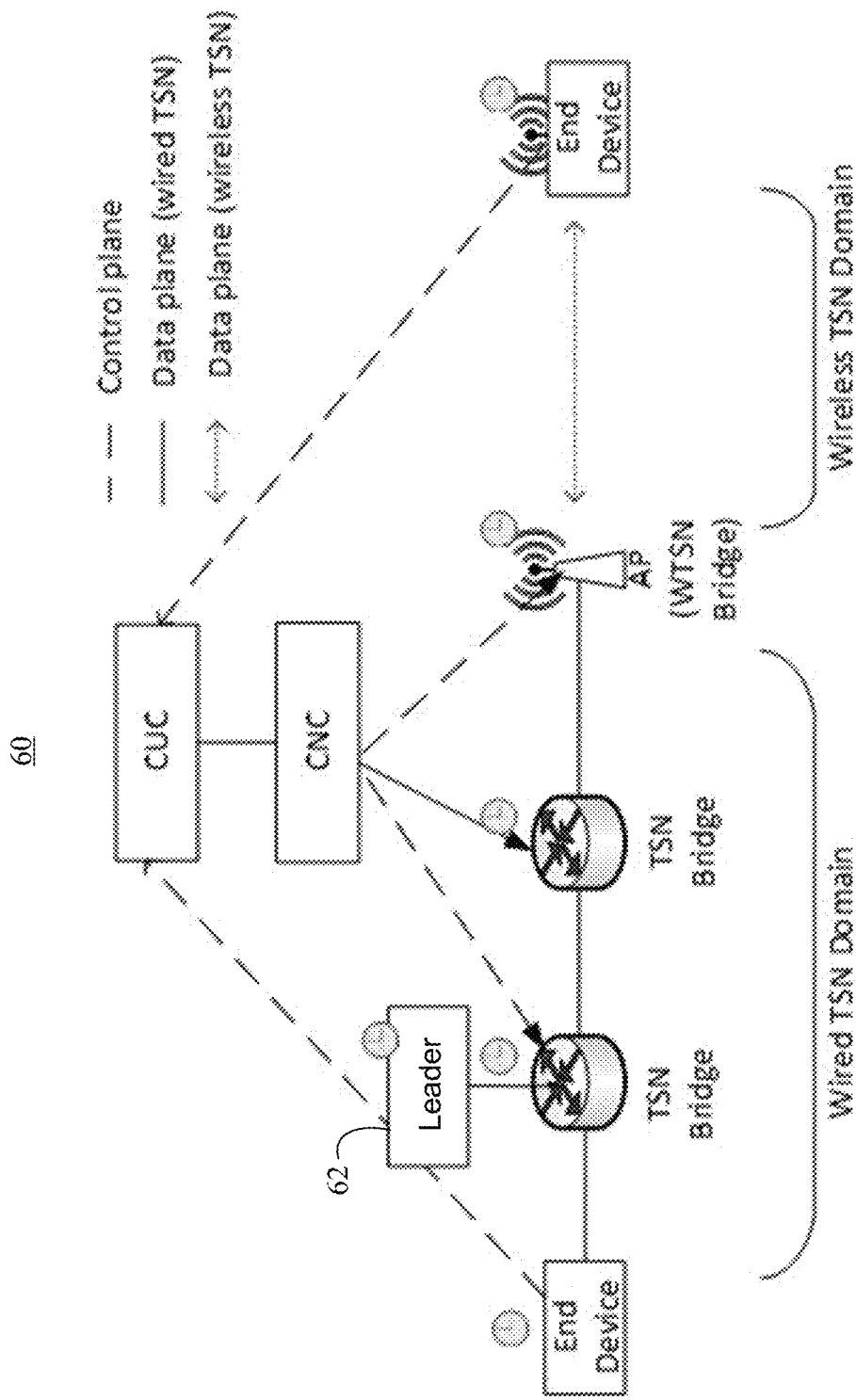
FIG. 5 is a block diagram of an example of a network topography having plane diversity according to an embodiment.

FIG. 5 shows a network topology 60 having plane diversity. More particularly, monitoring of the network by a leader node 62 can be done through data planes and control planes. In one example, the planes can be both wired and wireless. As a result, embodiments may increase the resiliency of the overall scheme due to the diversity of links that are used to monitor the network. Thus, non-compliant nodes may be further detected based on plane diversity data.

Figure 6:
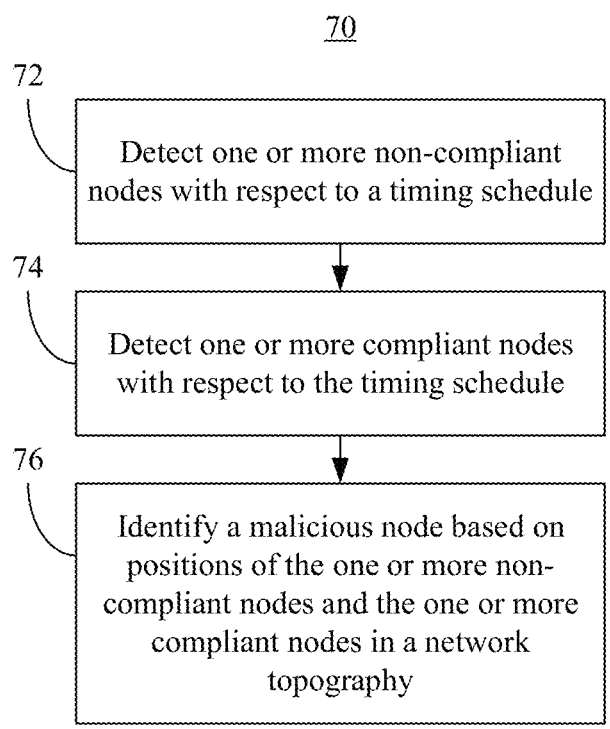
FIG. 6 is a flowchart of an example of a method of operating a monitor node according to an embodiment.

FIG. 6 shows a method 70 of operating a monitor node. The method 70 may generally be implemented in a network node such as, for example, the leader node 20a (FIGS. 1A-3E), the monitor node 50 (FIG. 4) and/or the leader node 62 (FIG. 5), already discussed. More particularly, the method 70 may be implemented in one or more modules as a set of logic instructions stored in a machine- or computer-readable storage medium such as random access memory (RAM), read only memory (ROM), programmable ROM (PROM), firmware, flash memory, etc., in configurable hardware such as, for example, programmable logic arrays (PLAs), field programmable gate arrays (FPGAs), complex programmable logic devices (CPLDs), in fixed-functionality hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 70 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

The illustrated processing block 72 detects one or more non-compliant nodes with respect to a timing schedule. In an embodiment, block 72 detects the non-compliant node(s) based on one or more of historical attribute data or plane diversity data. Block 74 detects one or more compliant nodes with respect to the timing schedule. In one example, the non-compliant node(s) and the compliant node(s) are detected based on one or more post-synchronization messages. Additionally, at least one of the post-synchronization message(s) may include a remote performance measurement and a keyed hash value. In such a case, the remote performance measurement may include one or more of a frame ingress time measurement, a residence time measurement or a correction field measurement. Moreover, the keyed hash value may be associated with a time stamp and a key pair shared by the monitor node and at least one of the non-compliant node(s). Block 76 identifies a malicious node based on positions of the non-compliant node(s) and the compliant node(s) in a network topography. The method 70 therefore enhances performance at least to the extent that the use of the timing schedule and the network topology enables the source of desynchronization attacks to be automatically determined.

Figure 7:
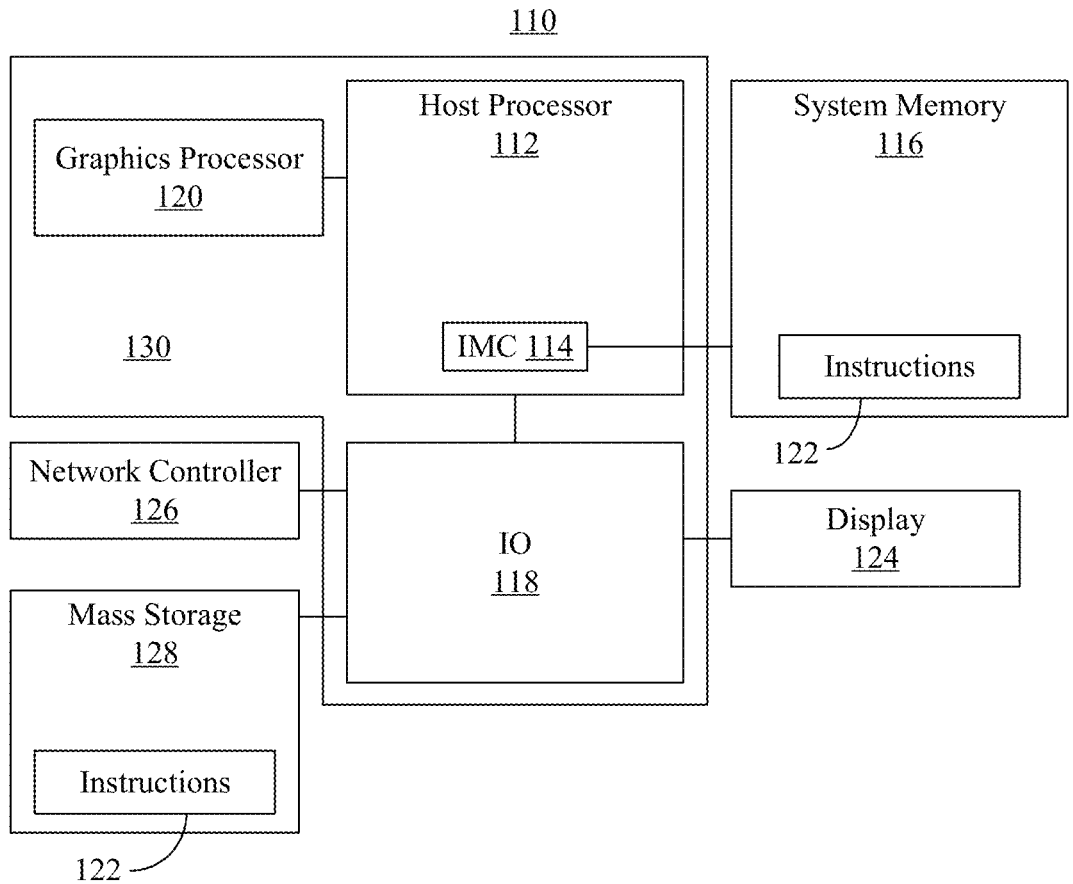
FIG. 7 is a block diagram of an example of a performance-enhanced computing system according to an embodiment.

Turning now to FIG. 7, a performance-enhanced computing system 110 is shown. The system 110 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), Internet of Things (IoT) functionality, etc., or any combination thereof.

In the illustrated example, the system 110 includes a host processor 112 (e.g., CPU) having an integrated memory controller (IMC) 114 that is coupled to a system memory 116. In an embodiment, an IO module 118 is coupled to the host processor 112. The illustrated IO module 118 communicates with, for example, a display 124 (e.g., touch screen, liquid crystal display/LCD, light emitting diode/LED display), a network controller 126 (e.g., wired and/or wireless), and a mass storage 128 (e.g., hard disk drive/HDD, optical disc, solid-state drive/SSD, flash memory, etc.). The system 110 may also include a graphics processor 120 (e.g., graphics processing unit/GPU) that is incorporated with the host processor 112 and the IO module 118 into a system on chip (SoC) 130.

In one example, the system memory 116 and/or the mass storage 128 includes a set of executable program instructions 122, which when executed by the SoC 130, cause the SoC 130 and/or the computing system 110 to implement one or more aspects of the method 70 (FIG. 6), already discussed. Thus, the SoC 130 may execute the instructions 122 to detect one or more non-compliant nodes with respect to a timing schedule, detect one or more compliant nodes with respect to the timing schedule, and identify a malicious node based on positions of the one or more non-compliant nodes and the one or more compliant nodes in a network topography. The computing system 110 is therefore considered performance-enhanced at least to the extent that the use of the timing schedule and the network topology enables the source of desynchronization attacks to be automatically determined.

Figure 8:
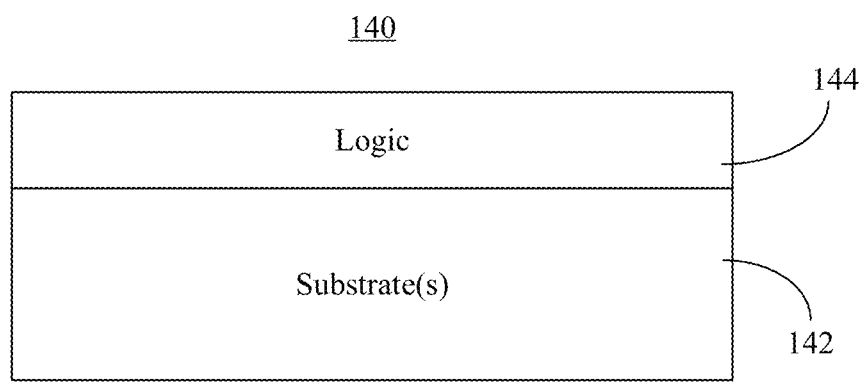
FIG. 8 is an illustration of an example of a semiconductor package apparatus according to an embodiment.

FIG. 8 shows a semiconductor apparatus 140 (e.g., chip and/or package including an auxiliary processor). The illustrated apparatus 140 includes one or more substrates 142 (e.g., silicon, sapphire, gallium arsenide) and logic 144 (e.g., transistor array and other integrated circuit/IC components) coupled to the substrate(s) 142. In an embodiment, the logic 144 implements one or more aspects of the method 70 (FIG. 6), already discussed. Thus, the logic 144 may detect one or more non-compliant nodes with respect to a timing schedule, detect one or more compliant nodes with respect to the timing schedule, and identify a malicious node based on positions of the one or more non-compliant nodes and the one or more compliant nodes in a network topography. The apparatus 140 is therefore considered performance-enhanced at least to the extent that the use of the timing schedule and the network topology enables the source of desynchronization attacks to be automatically determined.

The logic 144 may be implemented at least partly in configurable or fixed-functionality hardware. In one example, the logic 144 includes transistor channel regions that are positioned (e.g., embedded) within the substrate(s) 142. Thus, the interface between the logic 144 and the substrate(s) 142 may not be an abrupt junction. The logic 144 may also be considered to include an epitaxial layer that is grown on an initial wafer of the substrate(s) 142.

Figure 9:
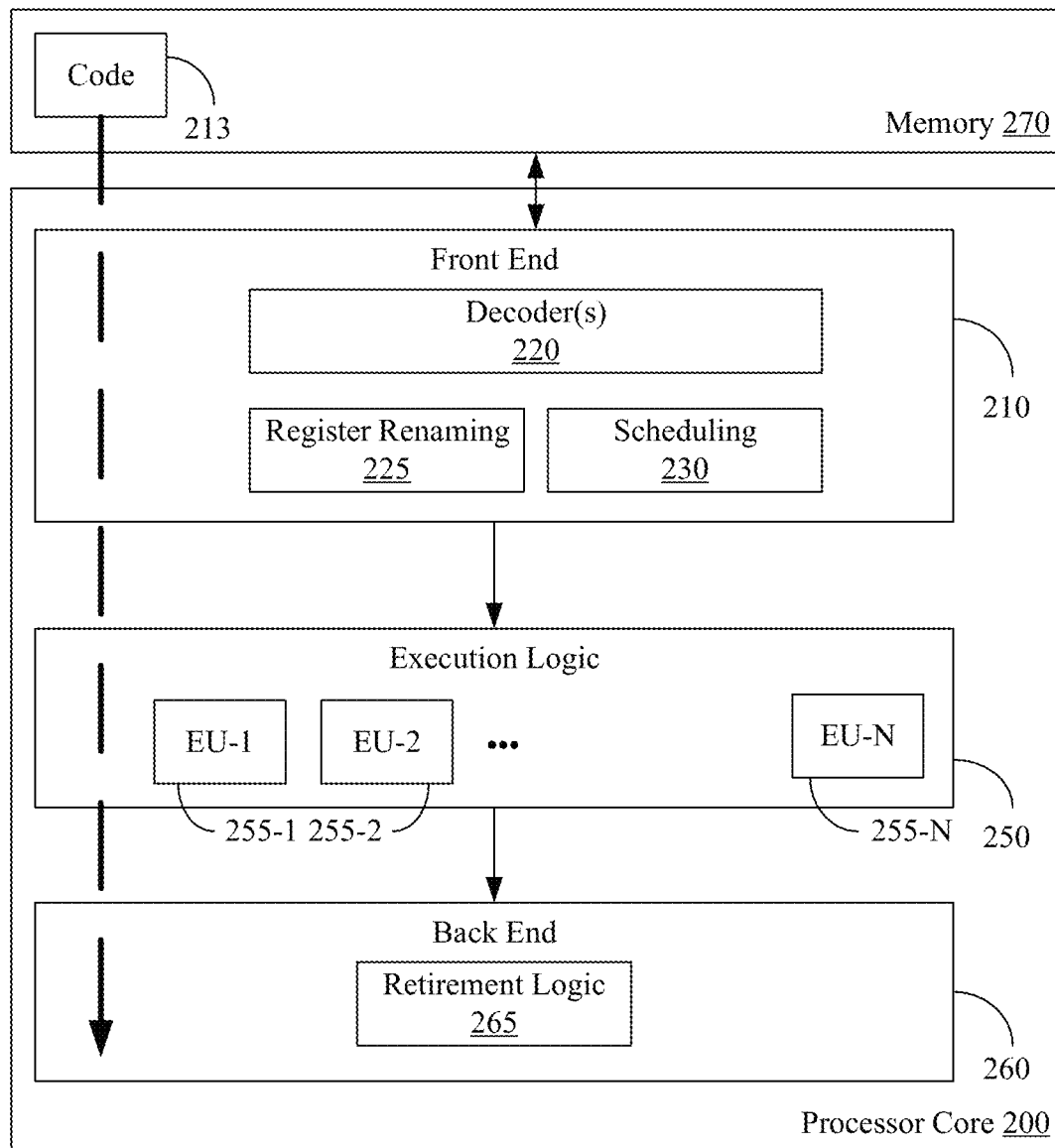
FIG. 9 is a block diagram of an example of a processor according to an embodiment.

FIG. 9 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 9, a processing element may alternatively include more than one of the processor core 200 illustrated in FIG. 9. The processor core 200 may be a single-threaded core or, for at least one embodiment, the processor core 200 may be multithreaded in that it may include more than one hardware thread context (or "logical processor") per core.

FIG. 9 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 70 (FIG. 6), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 9, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 10:
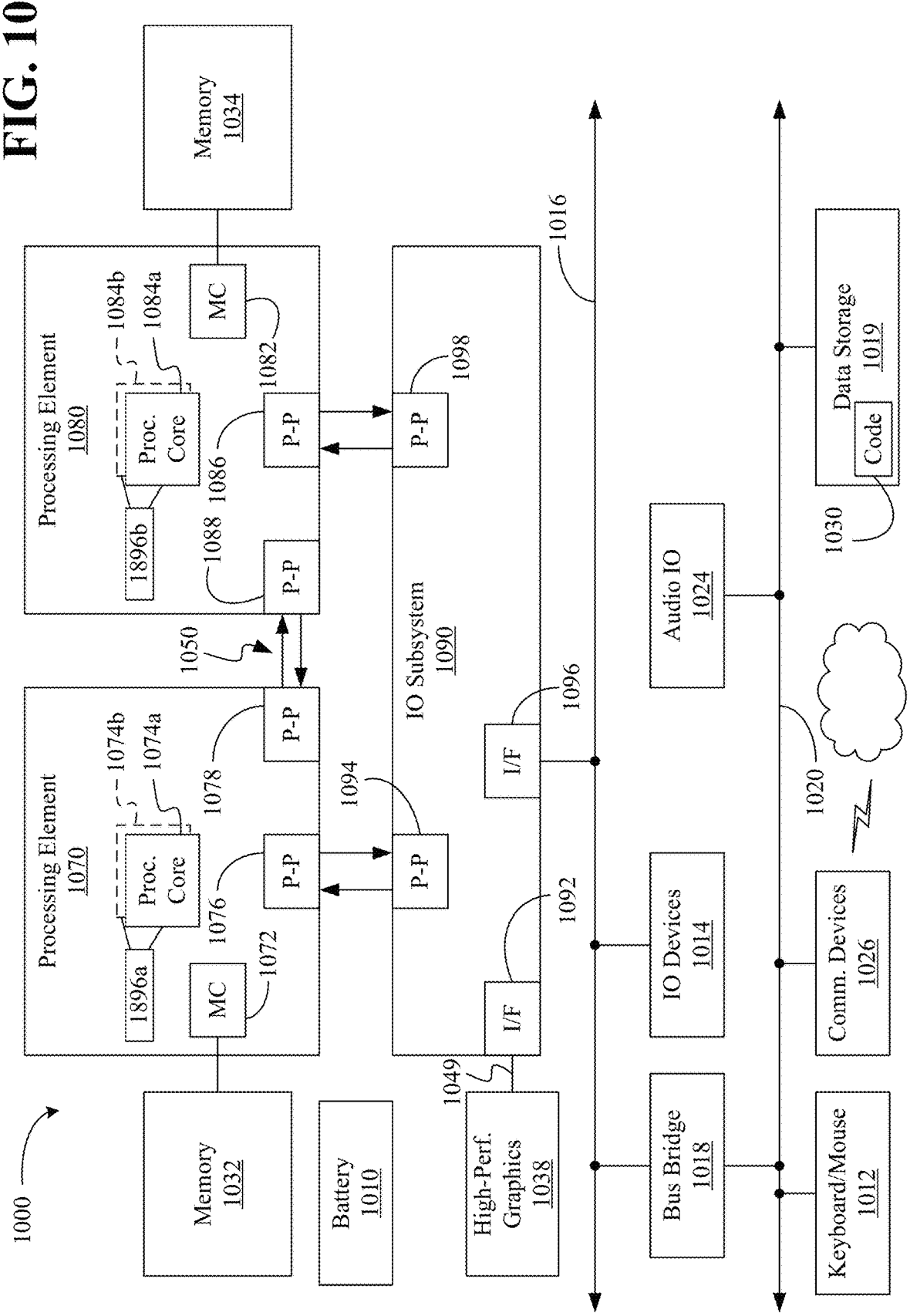
FIG. 10 is a block diagram of an example of a multi-processor based computing system according to an embodiment.

Referring now to FIG. 10, shown is a block diagram of a computing system 1000 embodiment in accordance with an embodiment. Shown in FIG. 10 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 10 may be implemented as a multi-drop bus rather than point-to-point interconnect.

As shown in FIG. 10, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 9.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 10, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 10, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 10, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 70 (FIG. 6), already discussed, and may be similar to the code 213 (FIG. 9), already discussed. Further, an audio I/O 1024 may be coupled to second bus 1020 and a battery 1010 may supply power to the computing system 1000.

Note that other embodiments are contemplated. For example, instead of the point-to-point architecture of FIG. 10, a system may implement a multi-drop bus or another such communication topology. Also, the elements of FIG. 10 may alternatively be partitioned using more or fewer integrated chips than shown in FIG. 10.

ADDITIONAL NOTES AND EXAMPLES

Example 1 includes a performance-enhanced computing system comprising a network controller, a processor coupled to the network controller, an a memory coupled to the processor, wherein the memory includes a set of instructions, which when executed by the processor, cause the processor to detect one or more non-compliant nodes with respect to a timing schedule, detect one or more compliant nodes with respect to the timing schedule, and identify a malicious node based on positions of the one or more non-compliant nodes and the one or more compliant nodes in a network topography.

Example 2 includes the computing system of Example 1, wherein the one or more non-compliant nodes and the one or more compliant nodes are to be detected based on one or more post-synchronization messages.

Example 3 includes the computing system of Example 2, wherein at least one of the one or more post-synchronization messages are to include a remote performance measurement and a keyed hash value.

Example 4 includes the computing system of Example 3, wherein the remote performance measurement is to include one or more of a frame ingress time measurement, a residence time measurement or a correction field measurement.

Example 5 includes the computing system of Example 3, wherein the keyed hash value is to be associated with a time stamp and a key pair shared by a monitor node and at least one of the one or more non-compliant nodes.

Example 6 includes the computing system of any one of Examples 1 to 5, wherein the one or more non-compliant nodes are to be detected based on historical attribute data and plane diversity data.

Example 7 includes a semiconductor apparatus comprising one or more substrates; and logic coupled to the one or more substrates, wherein the logic is implemented at least partly in one or more of configurable or fixed-functionality hardware, the logic to detect one or more non-compliant nodes with respect to a timing schedule, detect one or more compliant nodes with respect to the timing schedule, and identify a malicious node based on positions of the one or more non-compliant nodes and the one or more compliant nodes in a network topography.

Example 8 includes the semiconductor apparatus of Example 7, wherein the one or more non-compliant nodes and the one or more compliant nodes are to be detected based on one or more post-synchronization messages.

Example 9 includes the semiconductor apparatus of Example 8, wherein at least one of the one or more post-synchronization messages are to include a remote performance measurement and a keyed hash value.

Example 10 includes the semiconductor apparatus of Example 9, wherein the remote performance measurement is to include one or more of a frame ingress time measurement, a residence time measurement or a correction field measurement.

Example 11 includes the semiconductor apparatus of Example 9, wherein the keyed hash value is to be associated with a time stamp and a key pair shared by a monitor node and at least one of the one or more non-compliant nodes.

Example 12 includes the semiconductor apparatus of any one of Examples 7 to 11, wherein the one or more non-compliant nodes are to be detected based on historical attribute data and plane diversity data.

Example 13 includes at least one computer readable storage medium comprising a set of instructions, which when executed by a computing system, cause the computing system to detect one or more non-compliant nodes with respect to a timing schedule, detect one or more compliant nodes with respect to the timing schedule, and identify a malicious node based on positions of the one or more non-compliant nodes and the one or more compliant nodes in a network topography.

Example 14 includes the at least one computer readable storage medium of Example 13, wherein the one or more non-compliant nodes and the one or more compliant nodes are to be detected based on one or more post-synchronization messages.

Example 15 includes the at least one computer readable storage medium of Example 14, wherein at least one of the one or more post-synchronization messages are to include a remote performance measurement and a keyed hash value.

Example 16 includes the at least one computer readable storage medium of Example 15, wherein the remote performance measurement is to include one or more of a frame ingress time measurement, a residence time measurement or a correction field measurement.

Example 17 includes the at least one computer readable storage medium of Example 15, wherein the keyed hash value is to be associated with a time stamp and a key pair shared by a monitor node and at least one of the one or more non-compliant nodes.

Example 18 includes the at least one computer readable storage medium of any one of Examples 13 to 17, wherein the one or more non-compliant nodes are to be detected based on historical attribute data and plane diversity data.

Example 19 includes a method comprising detecting one or more non-compliant nodes with respect to a timing schedule, detecting one or more compliant nodes with respect to the timing schedule, and identifying a malicious node based on positions of the one or more non-compliant nodes and the one or more compliant nodes in a network topography.

Example 20 includes the method of Example 19, wherein the one or more non-compliant nodes and the one or more compliant nodes are detected based on one or more post-synchronization messages.

Example 21 includes the method of Example 20, wherein at least one of the one or more post-synchronization messages includes a remote performance measurement and a keyed hash value.

Example 22 includes the method of Example 21, wherein the remote performance measurement includes one or more of a frame ingress time measurement, a residence time measurement or a correction field measurement.

Example 23 includes the method of Example 21, wherein the keyed hash value is associated with a timestamp and a key pair shared by a monitor node and at least one of the one or more non-compliant nodes.

Example 24 includes the method of any one of Examples 19 to 23, wherein the one or more non-compliant nodes are detected based on historical attribute data and plane diversity data.

Example 25 includes means for performing the method of any one of Examples 19 to 24.

Thus, technology described herein follows a sequence of resynchronizations, detects the progression of deviations, and backtracks to the attacking node. The technology also globally performs KPI and/or attribute measurements at each hop in the network to determine where violations are occurring. Moreover, the technology aggregates the collection of historical data from the nodes.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An apparatus comprising:
    processing circuitry coupled to a memory, the processing circuitry to:
        detect one or more non-compliant nodes with respect to a timing schedule;
        detect one or more compliant nodes with respect to the timing schedule, wherein the timing schedule is based on one or more post-synchronization messages that are based on one or more remote performance measurements including one or more frame ingress time measurements; and
        identify a malicious node based on positions of the one or more non-compliant nodes and the one or more compliant nodes in a network topography, wherein the positions refer to placements of the one or more non-compliant nodes and the one or more compliant nodes with respect to one or more paths within the network topography, wherein the one or more non-compliant nodes and the one or more compliant nodes are to be detected based on the one or more post-synchronization messages.

2. The apparatus of claim 1, wherein at least one of the one or more post-synchronization messages includes a remote performance measurement of the one or more remote per for measurements and a keyed hash value.

3. The apparatus of claim 2, wherein the remote performance measurement includes a frame ingress time measurement of the one or more frame ingress time measurements, a residence time measurement or a correction field measurement.

4. The apparatus of claim 2, wherein the keyed hash value is to be associated with a time stamp and a key pair shared by a monitor node and at least one of the one or more non-compliant nodes.

5. The apparatus of claim 1, wherein the one or more non-compliant nodes are to be detected based on historical attribute data and plane diversity data.

6. At least one non-transitory computer-readable medium having stored thereon instructions which, when executed, cause a computing device to perform operations comprising:
   detecting one or more non-compliant nodes with respect to a timing schedule;
   detecting one or more compliant nodes with respect to the timing schedules wherein the timing schedule is based on one or more post-synchronization messages that are based on one or more remote performance measurements including one or more frame ingress time measurements; and
   identifying a malicious node based on positions of the one or more non-compliant nodes and the one or more compliant nodes in a network topography, wherein the positions refer to placements of the one or more non-compliant nodes and the one or more compliant nodes with respect to one or more paths within the network topography, wherein the one or more non-compliant nodes and the one or more compliant nodes are to be detected based on the one or more post-synchronization messages.

7. The non-transitory computer-readable of claim 6, wherein at least one of the one or more post-synchronization messages includes a remote performance measurement of the one or more remote performance measurements and a keyed hash value.

8. The non-transitory computer-readable medium of claim 7, wherein the remote performance measurement includes a frame ingress time measurement of the one or more frame ingress time measurements, a residence time measurement or a correction field measurement.

9. The non-transitory computer-readable medium of claim 7, wherein the keyed hash value is to be associated with a time stamp and a key pair shared by a monitor node and at least one of the one or more non-compliant nodes.

10. The non-transitory computer-readable medium of claim 6, wherein the one or more non-compliant nodes are to be detected based on historical attribute data and plane diversity data.

11. A method comprising:
    detecting one or more non-compliant nodes with respect to a timing schedule;
    detecting one or more compliant nodes with respect to the timing schedule, wherein the timing schedule is based on one or post-synchronization messages that are based on one or more remote performance measurements including one or more frame ingress time measurements; and
    identifying a malicious node based on positions of the one or more non-compliant nodes and the one or more compliant nodes in a network topography, wherein the positions refer to placements of the one or more non-compliant nodes and the one or more compliant nodes with respect to one or more paths within the network topography, wherein the one or more non-compliant nodes and the one or more compliant nodes are to be detected based on the one or more post-synchronization messages.

12. The method of claim 11, wherein at least one of the one or more post-synchronization messages includes a remote performance measurement of the one or more remote performance measurements and a keyed hash value.

13. The method of claim 12, wherein the remote performance measurement includes a frame ingress time measurement of the one or more frame ingress time measurements, a residence time measurement or a correction field measurement.

14. The method of claim 12, wherein the keyed hash value is associated with a timestamp and a key pair shared by a monitor node and at least one of the one or more non-compliant nodes.

15. The method of claim 11, wherein the one or more non-compliant nodes are detected based on historical attribute data and plane diversity data.

* * * * *